United States Patent [19]

Nieratscher et al.

[11] Patent Number: 4,932,214
[45] Date of Patent: Jun. 12, 1990

[54] PROCESSING SYSTEM FOR LIQUID HYDROGEN

[75] Inventors: Willi Nieratscher, Ammerbuch; Walter Peschka, Sindelfingen, both of Fed. Rep. of Germany

[73] Assignee: Deutsche Forsehungs- und Versuchsanslalt fuer Luft- und Raumfahrt e.v., Fed. Rep. of Germany

[21] Appl. No.: 278,975

[22] Filed: Dec. 2, 1988

[30] Foreign Application Priority Data

Oct. 4, 1987 [DE] Fed. Rep. of Germany ....... 3741145

[51] Int. Cl.$^5$ .................................. F17C 7/02
[52] U.S. Cl. ........................................ 62/50.6; 62/505
[58] Field of Search .................................. 62/50.6, 505

[56] References Cited

U.S. PATENT DOCUMENTS

| | | | |
|---|---|---|---|
| 3,260,061 | 7/1966 | Hampton et al. | 62/50.2 |
| 3,630,639 | 12/1971 | Duron et al. | 62/50.6 |
| 3,633,372 | 1/1972 | Kimmel et al. | 62/50.1 |
| 4,175,395 | 11/1979 | Prost et al. | 62/50.2 |
| 4,418,544 | 12/1983 | Heybutski et al. | 62/50.6 |

FOREIGN PATENT DOCUMENTS

| | | |
|---|---|---|
| 873251 | 7/1949 | Fed. Rep. of Germany . |
| AN14922 | 12/1953 | Fed. Rep. of Germany . |
| 1528363 | 7/1970 | Fed. Rep. of Germany . |
| 2443815 | 1/1983 | Fed. Rep. of Germany . |
| 3342582 | 6/1985 | Fed. Rep. of Germany . |
| 704289 | 2/1954 | United Kingdom ..................... 102/1 |

Primary Examiner—Ronald C. Capossela
Attorney, Agent, or Firm—Karmer, Brufsky & Cifelli

[57] ABSTRACT

To improve a processing system for liquid hydrogen comprising a storage tank and a supply unit arranged outside of and connected with the storage tank via a suction line, the supply unit comprising a feed pump which communicates on its pressure side with a motor feed line, such that the feed pump is constantly kept at operating temperature, it is suggested that the supply unit comprise a cool-stage casing completely surrounding the feed pump, the casing having hydrogen flowing through it which exits from the feed pump on the pressure side.

12 Claims, 1 Drawing Sheet

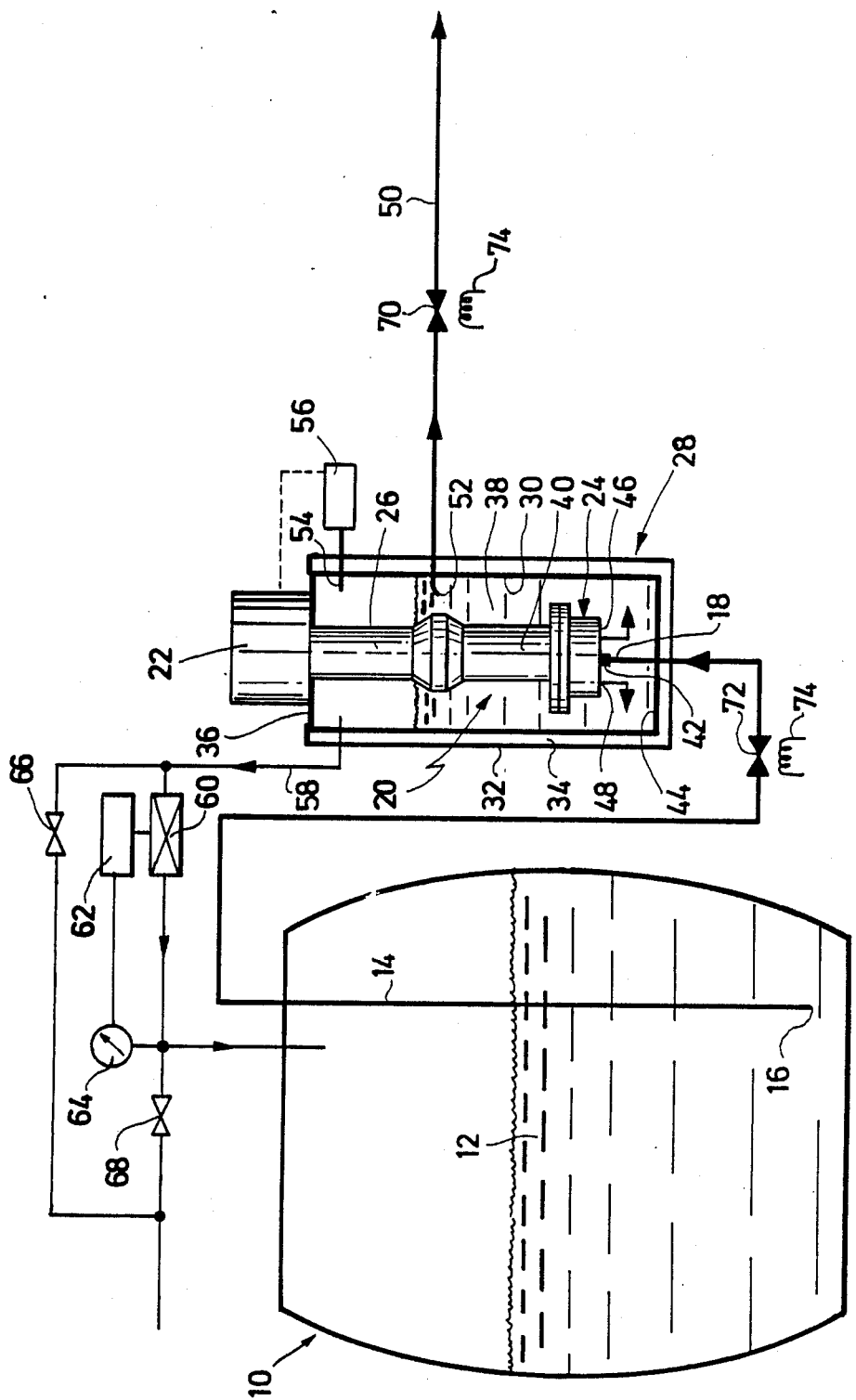

PROCESSING SYSTEM FOR LIQUID HYDROGEN

The invention relates to a processing system for liquid hydrogen comprising a storage tank and a supply unit arranged outside of and connected with the tank via a suction line, said supply unit comprising a feed pump communicating on its pressure side with a motor feed line.

A system of this type for processing liquid hydrogen is already known from German publication DE-OS No. 33 42 582.5. In this system the cryogenically stored liquid hydrogen is fed, with the feed pump running, from this pump to the motor with the corresponding pressure. However, the problem arises that when the system is started up the feed pump first has to be run until it is cold and an additional auxiliary gas pump is required for this. As long as the feed pump is constantly in operation the starting-up phase for cooling down the feed pump is of minor significance. However, when this system is used in motor vehicles there is the danger, due to the considerable differences in load and as a result the different amounts of hydrogen required, that the feed pump will warm up during a standstill or idling phase and will therefore need at least a partial cold phase during which it cannot provide the required power.

This does, however, result in problems during operation of the motor. When the motor is operated with fuel injection it requires hydrogen having a relatively constant high pressure and defined temperature, i.e. constant density, so that an exact dosage of the combustion mixture is possible through the injection valves. This cannot, however, be achieved when the feed pump does not provide sufficient power after a standstill phase but again requires a short cold-running phase.

An attempt has been made to solve this problem by arranging the feed pump so that it is submerged in the stored tank and therefore constantly kept cold by the liquid hydrogen stored therein. This arrangement has a serious disadvantage since it results in very high vaporization rates in the storage tank which lead to untenable overall losses due to vaporized hydrogen.

The object underlying the invention is therefore to improve a processing system for liquid hydrogen such that the feed pump can be kept constantly at operating temperature and, in addition, the vaporization rate in the storage tank can be kept as low as possible.

This object is accomplished in accordance with the invention, for a processing system of the type described at the outset, in that the supply unit comprises a cool-storage casing which completely surrounds the feed pump and has hydrogen which exits from the pressure side of the feed pump flowing through it. The core of the inventive solution is therefore to be seen in the fact that the feed pump, although arranged outside the storage tank, is surrounded by cool-storage casing which contains hydrogen exiting from the pressure side of the pump and keeps the feed pump at its operating temperature even during intermittent operation during the standstill phases so that the feed pump does not require any additional cold-running phase.

In an embodiment of the inventive system which has a particularly simple and practical construction, the cool-storage casing is designed as a thermally insulated pressure tank and the feed pump is arranged in the interior of this tank. This arrangement has the great advantage that it is very simple to construct and, in particular, enables the design of the feed pump to be simple in construction since the pump is arranged in a tank having a pressure which corresponds approximately to the maximum pressure in the feed pump and so the outer walls of the feed pump can, for example, be thinner and less stable. In addition, this construction has the advantage that the thermal insulation of the pressure tank serves at the same time as thermal insulation for the feed pump and so the pump does not need to be provided with additional insulation means.

The pressure tank can, in principle, be thermally insulated in a number of different ways. It is, however, particularly favourable for the pressure tank to be vacuum insulated since the warm-up rate in the interior of the tank can then be kept very low.

When the inventive processing system for liquid hydrogen is installed in motor vehicles, in particular, intermittent operation has to be expected, as explained at the outset. In addition, the feed pump is advantageously constructed as a single-cylinder piston pump so that, in the previous solutions, a pressure equalizing tank has to be connected to the output side of the supply unit to equalize the variations in pressure which occur. The inventive solution now offers the possibility of having the pressure tank designed at the same time as a pressure equalizing tank for the processing system. It is then no longer necessary to provide an additional pressure equalizing tank which has the big advantage, when the inventive system is used in a motor vehicle, that the inventive system requires considerably less space.

In order to supply the interior of the tank with as little heat as possible, it has proven expedient for a pump drive means to be arranged outside the pressure tank so that the supply of heat to the interior of the tank is as low as possible and therefore the warm-up rate can be kept at an optimum low level.

Within the scope of the inventive solution, the feed pump can, in principle, be arranged in the pressure tank in a number of various ways. However, so that cooling of the feed pump is as effective as possible, it is advantgeous for this pump to be disposed in the lowermost region of the pressure tank since the hydrogen with the lowest temperature collects in this region and therefore an optimum cooling of the feed pump can be attained.

To intensify this effect an outlet opening of the feed pump is disposed in the lowermost region of the pressure tank so that the hydrogen with the lowest temperature flows first of all around the feed pump arranged in the lowermost region of the pressure tank and cools this as effectively as possible.

During operation of the inventive system the hydrogen in the pressure tank is generally kept at such high pressures, which exceed the critical pressure of the hydrogen, that the hydrogen will no longer be separated in the pressure tank into two phases, i.e. a gas phase and a liquid phase, but only one phase is now present in the pressure tank. The pressure tank could therefore be designed such that it has approximately the same temperature throughout its interior. It is, however, far more advantageous to design the pressure tank such that a cooling bath consisting of hydrogen is formed therein and the feed pump is submerged in this bath. With this desing of the pressure tank it is also possible to generate a temperature gradient, despite the hydrogen being present in only one phase, in order to create a cooling bath consisting of hydrogen in the region having the lowest temperatures, in which the feed pump is then submerged and thereby arranged so as to be optimally cooled.

The simplest manner of obtaining such a cooling bath is for the motor feed line to open into the pressure tank above the feed pump so that this cooling bath can be formed in the pressure tank below the opening of the motor feed line.

When the inventive pressure tank is intended to serve as a pressure equalizing tank and thereby intended to operate at an optimum within the framework of the invention, it is expedient for the pressure tank to be provided with a pressure regulating means which switches off the feed pump when the pressure exceeds a maximum value and switches on the feed pump when the pressure falls below a minimum value.

So that the feed pump can operate at an optimum in the inventive processing system, it is necessary for a constant pressure to prevail at the suction side of the feed pump as well. In order to attain such a constant pressure at the suction side of the feed pump it is necessary for the operating pressure in the storage tank to be kept constant. For this purpose, the inventive solution expediently provides for a pressure line leading from the pressure tank into the storage tank and including a pressure regulating means for the storage tank, by means of which operating pressure in the storage tank can be adjusted. The pressure in the pressure tank can therefore, in accordance with the invention, be utilized at the same time to attain a constant operating pressure in the storage tank, as well, during operation.

In the inventive processing system for liquid hydrogen, the feed pump can, on the one hand, be cooled down as in the known processing systems having a feed pump arranged outside the storage tank. This means that for cooling down the feed pump it is, for example, conceivable to operate the motor with carburetion until the pump is cold enough to generate hydrogen having high pressures or to operate the motor with fuel injection but with this fuel injection occurring in the vicinity of the bottom dead center, for which the pressure in the storage tank is sufficient. One the other hand, it is also possible in the inventive system to provide a starting control means which closes a stop valve in the motor feed line, switches on the feed pump, increases the pressure in the storage tank to the operating pressure via the pressure regulating means for the storage tank and opens the stop valve in the motor feed line once the minimum pressure required by the motor is reached. This means that in the inventive system the feed pump itself is cooled down until such time as a minimum pressure required for operation with normal fuel injection is reached, whereupon the starting control means opens the stop valve in the motor feed line and it is possible to start the motor.

Additional features and advantages of the invention are the subject matter of the following description of an embodiment as well as of the drawing.

The drawing is a schematic illustration of an embodiment of an inventive processing system.

An embodiment of the inventive system, illustrated in the Figure, shows a storage tank 10 for hydrogen, in which a bath of liquid hydrogen 12 is present. This storage tank 10 is preferably vacuum insulated against the environment so that the vaporization rate of the hydrogen is low. The storage tank 10 is normally kept pressureless or at a low overpressure of, for example, a maximum of 4 bars.

A suction line 14 leads into the storage tank 10. This suction line is, on the one hand, submerged with its suction end 16 in the liquid hydrogen 12 and is, on the other hand, connected with its connection end 18 to a supply unit designated as a whole as 20.

This supply unit 20 comprises a pump drive 22 which drives a feed pump 24 via a connecting member 26 arranged between the pump drive 22 and the feed pump 24.

Both the connecting member 26 and the feed pump 24 are arranged in a pressure tank designated as a whole as 28. This tank is constructed of an inner tank 30, an outer tank 32 and a vacuum insulation 34 provided therebetween. This pressure tank 28 is closed on its upper side by a cover 36 which mounts the pump drive 22. The connecting member 26 extends from this cover into the interior 38 of the tank so that the feed pump 24 with its pump housing 40 is located completely within the interior 38 of the tank.

The suction line 14 also leads into the interior 38 of the tank and is connected to a suction pipe 42 of the pump housing 40.

In the embodiment illustrated in the drawing, the connecting member 26 and the pump housing 40 mounted thereon extend from the cover 36, which closes the pressure tank 28 on its upper side, in a vertical direction downwards to a floor 44 of the pressure tank 28. In this embodiment the suction pipe 42 is disposed on an underside 46 of the pump housing 40 facing the floor 44 of the pressure tank 28. In the same way, an outlet opening 48 of the pump housing 40 is provided on this underside 46 so that hydrogen exiting under pressure from this outlet opening 48 can flow around the entire pump housing 40.

The pressure tank 28 is preferably dimensioned such that the volume available for the hydrogen subjected to pressure is large enough for the pressure tank 28 itself to serve as a pressure equalizing tank and therefore fulfill two functions, namely on the one hand to cool the pump housing 40 and, on the other, to form the pressure equalizing tank which is required in any case for intermittent operation of the feed pump 24.

In order to be able to withdraw the hydrogen subjected to pressure from the pressure tank 26, a motor feed line 50 is provided. This leads into the tank and the hydrogen subjectd to pressure is then supplied to the internal combustion engine via this line. This motor feed line 50 has an inflow opening 52 which is arranged in the interior 38 of the tank such that the condensed hydrogen exiting from the outlet opening 48 flows along the entire pump housing 40 before reaching the inflow opening 52 of the motor feed line. In the vertical arrangement of the pump housing illustrated in this embodiment the inflow opening 52 is located in the interior 38 of the tank above the pump housing 40.

So that the entire supply unit 20 can supply the motor with hydrogen which has a relatively constant and high pressure as well as a defined temperature through the motor feed line 50, the pressure in the pressure tank 28, which serves at the same time as pressure equalizing tank, must be kept constant. For this purpose, a pressure sensor 54 projects into the pressure tank 28, for example in the vicinity of its cover 36. This sensor is connected with a control means 56 which switches off the pump drive 22 when a maximum pressure is reached in the pressure tank and switches the drive on when the pressure in the pressure tank 28 falls to a minimum.

In addition, a pressure line 58 leads out the pressure tank 28, for example in the region near the cover 36, and opens into the storage tank 10. This pressure line 58 is also provided with a valve 60, with which a transfer of hydrogen from the pressure tank 28 to the storage tank 10 can be switched on and off. This valve 60 is also connected with a control means 62 with which a pressure sensor 64 is also associated for detecting the pressure in the storage tank 10.

For safety reasons, a safety valve 66 branches off the pressure line 58 upstream of the valve 60. This safety valve is set to the maximum pressure of the pressure tank 28. In addition, a relief pressure valve 68 branches off the pressure line 58 downstream of the valve 60. This valve is set to a maximum pressure in the storage tank 10 and therefore prevents this maximum pressure being exceeded in the storage tank 10.

In order to be able to operate the inventive system in a suitable manner, a stop valve 70 is provided on the motor side in the motor feed line 50 and an additional stop valve 72 on the tank side in the suction line 14. These two valves are preferably actuated via a starting control means 74.

The inventive system functions as follows:

When the system is switched off, both the stop valve 72 on the tank side and the stop valve 70 on the motor side are closed. The storage tank 10 is also kept pressureless or at a low overpressure.

If the supply unit 20, i.e. in particular its feed pump 24, is now to be cooled down, the stop valve 72 on the side of the tank is first opened and the supply unit 20 switched on so that its pump drive 22 drives the feed pump 24. This feed pump 24 now begins, without operating at an optimum, to draw in hydrogen via the suction line 14. This is simultaneously assisted by the fact that the storage tank 10 is kept at a slight overpressure. The suction line 14 then has hydrogen flowing through it which is already vaporizing in this line and which passes through the feed pump 24 and exits from its outlet opening 48 into the interior 38 of the pressure tank 28. Since the feed pump 24 is in operation, pressure is built up in the interior 38 of the tank and this pressure is higher than the pressure in the suction line 14. In order to utilize this pressure building up in the tank interior 38, the valve 60 in the pressure line 58 leading from the pressure tank 28 to the storage tank 10 is opened by the starting control means 74 via the control means 62. The overpressure building up in the tank interior will also lead to an increase in pressure in the storage tank 10 although the pressure in the storage tank 10 will not exceed a maximum pressure determined by the relief pressure valve 68. This increase in pressure in the storage tank 10 also causes the flow of liquid hydrogen to the feed pump 24 via the suction line 14 to increase so that the feed pump 24 can build up an adequate pressure in the pressure tank 28 very quickly. The feed pump is hereby cooled down at the same time and kept cool by the hydrogen remaining in the tank interior 38. As soon as an adequate pressure is available in the pressure tank 28 the stop valve 70 on the side of the motor is opened by the starting control means 74 so that hydrogen can be withdrawn from the pressure tank 28 via the motor feed line 50. The control means 62 with the pressure sensor 64 continues to keep the storage tank 10 at its maximum pressure during operation.

Depending on the amount of hydrogen withdrawn via the motor feed line 50, the feed pump is switched on and off by the control means 56 at shorter or longer intervals in response to the pressure detected by the pressure sensor 54 in the pressure tank 28.

During operation, the pressure tank 28 is operated at a minimum pressure of 70 bars and a maximum pressure of 95 bars. At these pressures the hydrogen in the tank interior 38 is in an overcritical phase, i.e. there is no separation between liquid phase and gas phase. However, a temperature gradient will be present in the pressure tank from its floor 44 to its cover 36 so that it can primarily be said that the feed pump 24 is arranged in a hydrogen bath which extends from the floor 44 as far as the inflow opening 52 of the motor feed line which is arranged above the condenser 24.

If the feed pump 24 is switched off once the maximum pressure of 95 bars is reached, this pump still remains, with its pump housing 40, in the bath of hydrogen reaching from the floor 44 to the inflow opening 52 and is thereby kept at its cold operating temperature. The continued withdrawal of hydrogen from the pressure tank 28 via the motor feed line 50 leads to a drop in pressure, whereby the minimum pressure is reached at the latest when the bath of hydrogen merely reaches as far as the inflow opening 52 of the motor feed line 50. Since, as already described above, the inflow opening 52 is arranged above the pump housing 40 of the feed pump 24, the pump is, when switched on, still submerged in the bath and therefore maintained at its operating temperature so that once the feed pump 24 is switched on this can immediately feed hydrogen at full power and does not require a renewed start-up phase.

The present disclosure relates to the subject matter disclosed in German application No. P 37 41 145.4 of December 4, 1987, the entire specification of which is incorporated herein by reference.

We claim:

1. A processing system for liquid hydrogen, comprising:
   a storage tank;
   a supply unit arranged outside of said storage tank, said supply unit comprising a feed pump having a suction connection for liquid hydrogen and a pressure connection for delivery of pressurized hydrogen, said suction connection being connected with said storage tank via a suction line;
   a thermally insulated pressure equalizing tank for equalizing pressure variations in said pressurized hydrogen generated by said feed pump, said feed pump being arranged in the interior of said pressure equalizing tank;
   a cooling volume inside said pressure equalizing tank, said cooling volume completely surrounding said feed pump and said cooling volume receiving pressurized liquid hydrogen from said pressure connection; and
   a feed line connected with said pressure equalizing tank for delivery of pressurized and pressure equalized hydrogen to a user.

2. Processing system as defined in claim 1 further including a pump drive means for driving said feed pump disposed outside the pressure equalizing tank.

3. Processing system as defined in claim 2 wherein said feed pump is arranged in the lowermost region of the pressure equalizing tank.

4. Processing system as defined in claim 3 wherein said pressure connection of said feed pump is arranged in the lowermost region of the pressure equalizing tank.

5. Processing system as defined in claim 4 wherein said pressure equalizing tank is designed such that a cooling bath consisting of hydrogen is formed therein and the feed pump is submerged in this cooling bath.

6. Processing system as defined in claim 5 wherein said feed line opens into the pressure equalizing tank above the feed pump.

7. Processing system as defined in claim 1 wherein the pressure equalizing tank is provided with a pressure regulating means for switching off the feed pump when the pressure exceeds a maximum value and switching on the feed pump when the pressure falls below a minimum value.

8. Processing system as defined in claim 7 wherein said minimum value exceeds the critical pressure of hydrogen.

9. A processing system for liquid hydrogen, comprising;
   a storage tank;
   a supply unit arranged outside of said storage tank, said supply unit comprising a feed pump having a suction connection for liquid hydrogen and a pressure connection for delivery of pressurized hydrogen, said suction connection being connected with said storage tank via a suction line;
   a thermally insulated pressure equalizing tank for equalizing pressure variations in said pressurized hydrogen, said feed pump being arranged in the interior of said pressure equalizing tank;
   a cooling volume inside said pressure equalizing tank, said cooling volume completely surrounding said feed pump and said cooling volume receiving pressurized liquid hydrogen from said pressure connection, said cooling volume being designed to maintain a cooling bath of hydrogen in which said feed pump is submerged; and
   a feed line connected with said pressure equalizing tank for delivery of pressurized and pressure equalized hydrogen to a user.

10. A processing system for liquid hydrogen, comprising:
    a storage tank;
    a supply unit arranged outside of said storage tank, said supply unit comprising a feed pump having a suction connection for liquid hydrogen and a pressure connection for delivery of pressurized hydrogen, said suction connection being connected with said storage tank via a suction line;
    a thermally insulated pressure equalizing tank for equalizing pressure variations in said pressurized hydrogen, said feed pump being arranged in the interior of said pressure equalizing tank;
    a cooling volume inside said pressure equalizing tank, said cooling volume completely surrounding said feed pump and said cooling volume receiving pressurized liquid hydrogen from said pressure connection;
    a feed line connected with said pressure equalizing tank for delivery of pressurized and pressure equalized hydrogen to a user;
    a stop valve arranged in said feed line; and
    control means for controlling said stop valve for keeping the pressure equalizing tank and the cooling volume therein under at least a minimum pressure.

11. A processing system according to claim 10 further comprising
    a pressure line connecting said pressure equalizing tank and said storage tank;
    a stop valve in said pressure line; and
    control means associated with said storage tank for adjusting operating pressure in said storage tank.

12. Processing system as defined in claim 11 further including a starting control means for closing said stop valve in said feed line when the hydrogen pressure is below said minimum pressure, for switching on said feed pump, for increasing pressure in said storage tank to the operating pressure via said pressure regulating means for said storage tank and for opening said stop valve in said feed line when said minimum pressure is reached.

* * * * *

UNITED STATES PATENT AND TRADEMARK OFFICE
CERTIFICATE OF CORRECTION

PATENT NO. : 4,932,214
DATED : June 12, 1990
INVENTOR(S) : Willi Nieratschker et al.

It is certified that error appears in the above-identified patent and that said Letters Patent is hereby corrected as shown below:

On the title page:

Item [75] Inventors:, "Willi Nieratscher" should read --Willi Nieratschker--.

Item [73] Assignee:, "Deutsche Forsehungs- und Versuchsanslalt fuer Luft- und Raumfahrt e.v." should read --Deutsche Forschungs- und Versuchsanstalt fuer Luft- und Raumfahrt e.V.--.

Signed and Sealed this

Eighth Day of October, 1991

Attest:

HARRY F. MANBECK, JR.

*Attesting Officer*  Commissioner of Patents and Trademarks